United States Patent

[11] 3,530,820

| [72] | Inventor | Henri Morgenroth<br>3090 Hidden Valley Lane, Santa Barbara,<br>California 93103 |
|---|---|---|
| [21] | Appl. No. | 685,365 |
| [22] | Filed | Nov. 24, 1967 |
| [45] | Patented | Sept. 29, 1970 |

[54] METHOD OF SUPPORTING NUMBER TABS ON HELICAL SPRING
2 Claims, 7 Drawing Figs.

| [52] | U.S. Cl. | 116/129 |
|---|---|---|
| [51] | Int. Cl. | G09f 9/00 |
| [50] | Field of Search | 116/129, 135; 58/126; 73/338; 74/(Consulted); 324/(Consulted) |

[56] References Cited
UNITED STATES PATENTS

| 2,289,038 | 7/1942 | Putman | 58/126 |
|---|---|---|---|
| 2,411,041 | 11/1946 | Kahn | 116/129UX |
| 2,883,958 | 4/1959 | Du Bois | 116/129 |
| 3,317,130 | 5/1967 | Evans | 116/129UX |

*Primary Examiner*—Louis J. Capozi

ABSTRACT: The method of attaching number carrying tabs to a helical spring used in a simple mechanical analogue multiplying computer by tensioning the spring slightly more than its maximum working length and inserting flat numbered tabs having portions adapted to be retained by the spring coils when the spring is in its normal working length.

Patented Sept. 29, 1970

3,530,820

*INVENTOR.*
HENRI MORGENROTH

METHOD OF SUPPORTING NUMBER TABS ON HELICAL SPRING

BACKGROUND OF THE INVENTION

This invention relates to an improvement of the simple mechanical analogue multiplying computer, consisting of a helical spring which carries numbered tabs at regular intervals. Specifically, this invention relates to an improved method of attaching number carrying tabs to the spring. These devices are commonly used as proportional rulers or scales, for changing the scale of chart curves amongst other numerous applications. They are also used for measuring distances on aeronautical charts directly in minutes, instead of miles.

SUMMARY OF THE INVENTION

The basic function of this multiplying device is as follows:

The overall stretching of the helical spring represents one multiplication factor, the scale graduation marked on the tabs represents the other factor, and the distance between the proportionally stretched tabs represents the result of this multiplication.

Specifically, the object of the invention is an improved method to attach the number carrying scale tabs to the spring.

The method of attaching these tabs represents a considerable problem.

It has been attempted to attach the tabs to the spring by clamping a sheetmetal fold over part of a coil of the spring.

This creates spring distortions at the attachment point, thus disturbing the accuracy of the device, which depends on exact proportional expansion throughout the length of the spring.

Connecting the tabs to the spring by means of welding is impossible, because the spring will be annealed at the point of attachment.

Low temperature soldering, which avoids such annealing, also has its problems, since the connection is subject to varying stresses, according to changing spring expansions. The soldered joint with the thin music wire of the spring may not stand up under these stresses.

The invention offers a solution to these problems. It gives a new method and design combining secure clamping with a minimum of assembly cost. Furthermore, the new attachment device does not disturb the proportionally accurate expansion of the spring.

DESCRIPTION AND DRAWINGS

Figure 1:
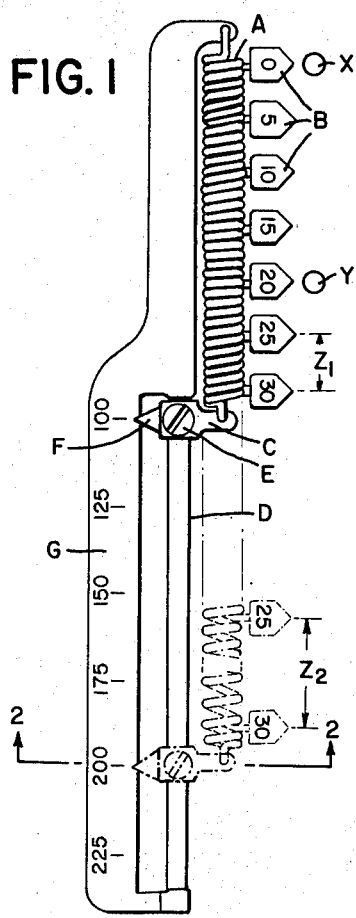
FIG. 1 shows a view of a typical simple example of such a spring computer, in its application as an aerial navigation computer.
Figure 2:
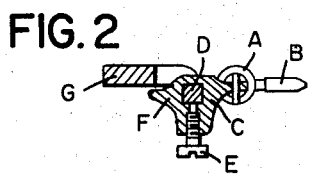
FIG. 2 shows a cross section through this computer.

Referring first to FIGS. 1 and 2, the application of the analogue computer to measuring distances on aerial (or nautical) charts directly in flying time.

Here A denotes the helical computer spring. B are the numbered tabs. They represent flying time in 5 minute increments. C is a sliding member, which can be moved on the guide bar D and clamped in various positions by means of the screw E. This slide carries a pointer F, which registers with a scale G. This scale is calibrated in miles per hour.

The small circles X and Y represent the location of, for instance, two airports on an aeronautical chart. The Minute tabs will measure the flying time between these points on the chart.

With the pointer on the 100 m.p.h. position, the tab connected to the computer spring shows that the flying time between the two airports is 20 minutes.

If the pointer is moved to the 200 m.p.h. mark, as shown in the lower part of FIG. 1, the spring is stretched to twice the lengths. All distances between the Zero tab and each minute tab increase proportionally, thus being in fact multiplied by the amount of stretching of the spring, as indicated by the pointer F. For 200 m.p.h., the flight time between the chart points X and Y is reduced to 10 minutes, and the minute tab 10 will show this by being stretched to the location of airport Y.

Expressed differently, the Time Scale formed by the minute tabs B grows proportionally to the overall stretching of the computer spring A. In the position of the pointer S at 200 m.p.h., the distance $Z_2$ between the minute tabs 25 and 30 is exactly twice the distance $Z_1$ when pointer S is at 100 m.p.h.

The distances flown in time indicated by the minute tabs are multiplied by the speed indicated by the slide.

It is apparent that, for maximum utility the spring should be stretchable to a multiple of its smallest length. This requires a low springrate, which in turn requires the highest possible number of coils. To accomplish this, the coils should almost touch each other in the 100 m.p.h. position shown on FIG. 1. Such a closely wound spring allows stretching to the 200 m.p.h. position or more, without stretching the spring beyond the point of a permanent set (yield point).

In other words in the 100 m.p.h. position, the spring should be almost at its compressed length.

This requirement points to one of the main problems of attaching tabs to a coil spring.

It has been previously stated that soldering is not a practical solution, because of the varying deformation at the part of the arc of the coil used for attachment.

Thus, the only remaining solution is some clamping device. Whatever is selected, it will always take a certain space on each side of the attaching coil, with a resultant irregularity in the coil spacing at this point. This irregularity will reflect itself in computer inaccuracies. Any clamping will create a distortion of the spring at this clamping point. It is difficult to control this distortion to be equal at all tabs. Thus, the accuracy of the computer spring is disturbed and greatly reduced.

One object of the invention is to create space in a tightly wound spring for this clamping process, without affecting accuracy of proportional stretching.

Figure 3:
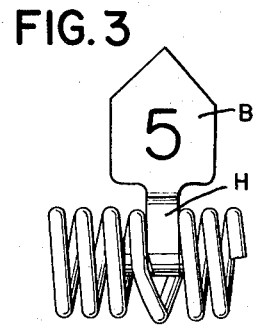
FIG. 3 shows an enlarged part of a computer spring, with one tab attached to it.
Figure 4:
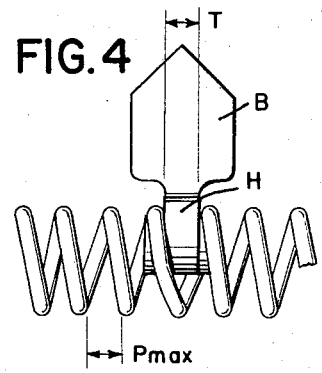
FIG. 4 shows the same device in its maximum stretched condition.

FIGS. 3 and 4 show enlarged the basic principle of this solution.

FIG. 3 shows part of the spring in the shortest position (100 m.p.h. in this example).

FIG. 4 shows the same part of the spring in the maximum stretched position (200 m.p.h. in this example).

The tab B is attached to a base H which is clamped between two spring coils. Details of this base design are explained later.

According to the invention the thickness T of this base H must be greater than the maximum distance Pmax. between two working coils.

The base is clamped between two coils, and this clamping length of the coil is entirely eliminated from the variable stretching of all the other coils, since it is permanently at more than the normal operational stretching length. In both FIGS. 3 and 4, the coil distance remains unchanged while the distances between the working coils change from almost compressed to Pmax.

Thus the clamping coils are immobilized and excluded from participation in the variable stretching (computing) process. This immobilization of two coils at each clamping point eliminates any proportional stretching inaccuracies, regardless of a possible disturbance of the shape and elastic property of these two coils during clamping (assembly) operation. These two distorted coils do not participate in the operational stretching and just add a constant length.

The thickness T of the base H creates a separation of two coils, which is equal for all tabs.

This width and the spring must be so dimensioned, that the coil separation at the base is less than a stretch to the yield point of the spring, but more than the maximum opening of the coils during computer operation.

The specific design of the clamping base will now be explained.

Figure 5:
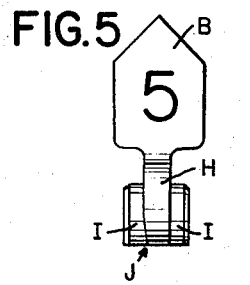
FIG. 5 shows the top view of the tab with its attachment device.
Figure 6:
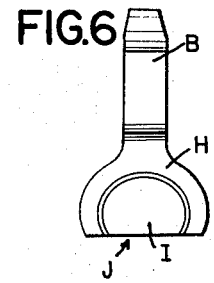
FIG. 6 shows the side view of the same tab.

FIGS. 5 and 6 give the top and side view respectively of the number tab with its base. The drawing shows this part three times enlarged, from an actual working model.

The tab B is connected to a disk shaped base H. This base carries two cylindrical stubs I on each side.

Both these stub cylinders and the base disk are flattened on the side opposite the tab B by means of the cut-off J.

Figure 7:
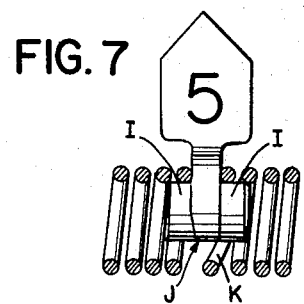
FIG. 7 shows the device of FIG. 5, attached to a sectioned computer spring.

FIG. 7 shows the same tab, mounted on the computer spring. The spring is shown sectioned.

The cut-off J permits the stretched coil part K of the coil to skip from the left stub I to the right stub I. Instead of a straight cut-off also arced cut-offs or wide notches are possible.

It was pointed out before, that the thickness T must be so selected, that it is greater than the maximum operational separation between coils, but smaller than the yield of the spring, that is smaller than a permanent stretched setting of the spring.

From this condition it becomes apparent that the base H is simply clamped elastically between two coils. The two stubs I protrude inside the coil spring, thus locating the base and tab firmly along the center line. It is also possible to use only one stub, for centering the base.

The elastic forces set up by the bridging half-turn K of the spring create a strong self locking effect, since this part of the spring impinges in an angled direction between the cut-off flat J of the base disk H.

It has been found, that the permanent and immobilized elastic stretching of the coil K (which never moves when the free parts of the spring are stretched by sliding the slide C), indeed preserves the complete accuracy of the computing device. The length of this immobilized coil part is exactly the same at all tabs, the width of the bases is also equal, thus insuring an equal proportional stretching between all flags.

A further advantage of this attachment system is the ease of assembly. The computer spring is simply stretched somewhat beyond the maximum operational elongation of the 200 m.p.h. position.

The tabs are then snapped in with the help of a rig, which locates the tabs at the proper distance for the spring elongation used in assembly.

In other words, the elasticity of the spring itself is used for clamping the tab base. This is far simpler than assembly by folding a thin sheetmetal base over part of the coil. The base according to FIGS. 5 and 6 has no parts which have to be bent or distorted, in order to achieve the clamping effect. Thus, the numbered tabs and the base can simply be a rigid single piece, molded, for instance, from plastic.

I claim:

1. An analogue computer of the class described, comprising:
   a. a longitudinally extending base having a spring attaching end and a variable scale indicating end;
   b. a guideway positioned adjacent and parallel to said scale indicating end;
   c. an adjustable slide positioned on said guideway for movement therealong, said slide having means for alignment with said scale;
   d. a helical spring attached to said end and to said slide;
   e. numbered indicating tabs secured to said spring at regular intervals, said tabs having a number carrying portion and a spring engaging portion; and
   f. means to clamp said spring engaging portion H between adjacent coils of said helical spring, said spring engaging portion carrying one cylindrical extension I on each side, the axis of said cylindrical extentions being aligned with the axis of said helical spring and being adapted to be secured within said adjacent spring coils, said spring engaging portion and said cylindrical extensions carrying a flattened segment J on the side opposite said number carrying portion in such a manner that part of a turn of said helical spring, connects adjacent coils on each side of said spring engaging portion by the way opened by means of said flat portion.

2. The invention of claim 1 in which the spring engaging portion is of a thickness greater than the maximum distance between adjacent coils of said spring during maximum extension of said spring along said guideway by said slide.